E. S. KIMBALL.
BLOWPIPE.
APPLICATION FILED NOV. 9, 1908.
931,623.
Patented Aug. 17, 1909.
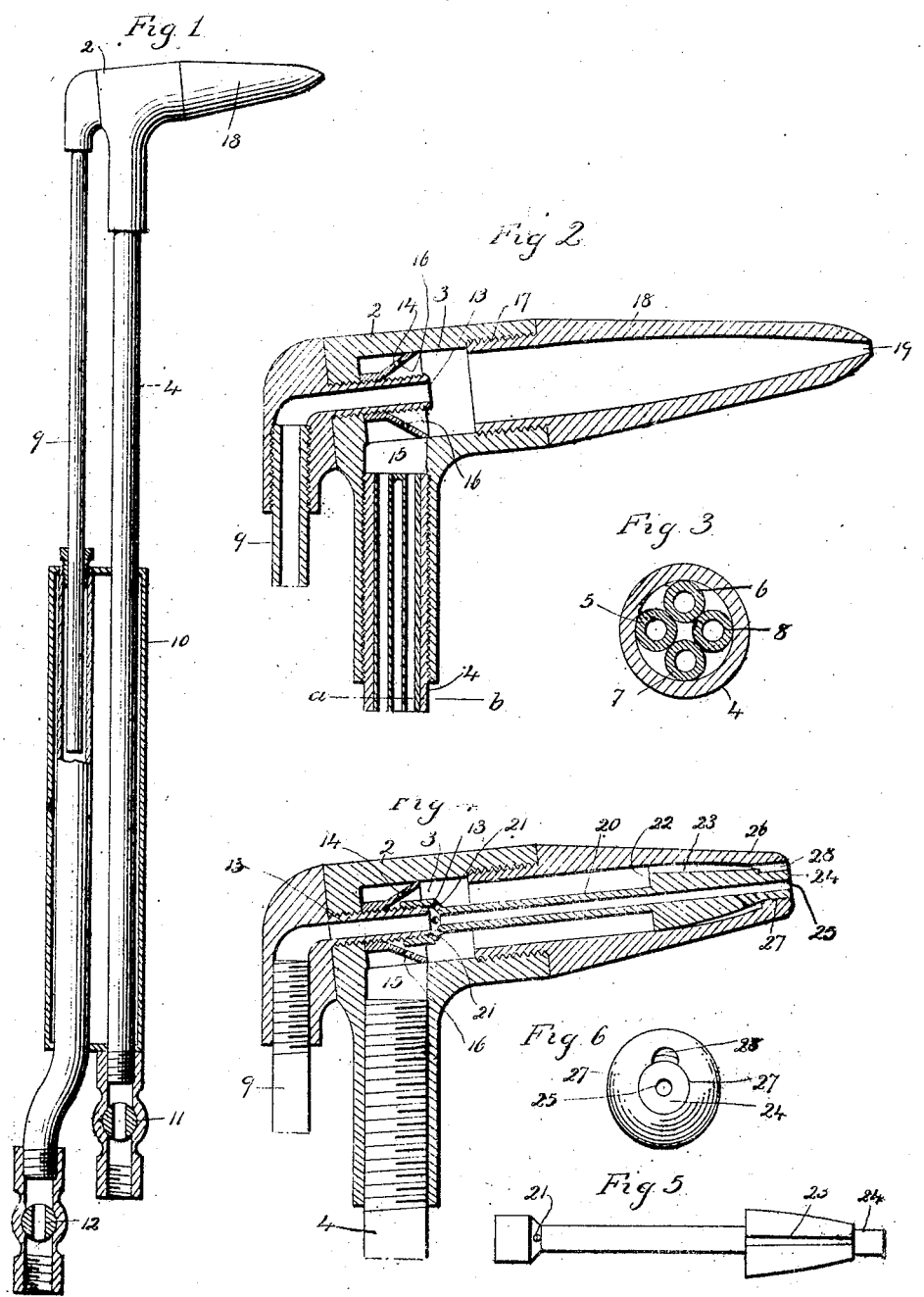

UNITED STATES PATENT OFFICE.

ERASTUS S. KIMBALL, OF NEW HAVEN, CONNECTICUT.

BLOWPIPE.

No. 931,623.  Specification of Letters Patent.  Patented Aug. 17, 1909.

Application filed November 9, 1908. Serial No. 461,683.

*To all whom it may concern:*

Be it known that I, ERASTUS S. KIMBALL, a citizen of the United States, residing at New Haven, in the county of New Haven and State of Connecticut, have invented a new and useful Improvement in Blowpipes; and I do hereby declare the following, when taken in connection with the accompanying drawings and the characters of reference marked thereon, to be a full, clear, and exact description of the same, and which said drawings constitute part of this specification, and represent, in—

Figure 1 a side view partially in section of a blow pipe constructed in accordance with my invention. Fig. 2 a sectional view of the upper portion of the same on an enlarged scale. Fig. 3 a sectional view on line $a$—$b$ of Fig. 2. Fig. 4 a sectional view of a blow pipe with a cutting nozzle. Fig. 5 a side view of the auxiliary nipple, detached. Fig. 6 a view of the outer end of the blow pipe in Fig. 4, enlarged.

This invention relates to an improvement in blow pipes such as are used in welding or in cutting metal, that is, a blow pipe adapted to burn a gas with which a current of oxygen is mixed, the object of the invention being the construction and arrangement of parts whereby the proper mixture and delivery of gas and oxygen will be made for any desired purpose; and the invention consists in the construction hereinafter described and particularly recited in the claims.

In carrying out my invention I employ a metal head 2 having a chamber 3 into which a gas pipe 4 discharges. Preferably and as herein shown this gas pipe 4 is made up of four small straight tubes 5, 6, 7 and 8 inclosed within an outer casing which is threaded into the head. The purpose of utilizing small tubes is to prevent fireback. By using tubes of small diameter I am enabled to use straight tubes and thus produce a compact construction. Also discharging into the chamber 3 is an oxygen pipe 9. These pipes pass through a sheathing 10 and are respectively provided with valves 11 and 12 of usual construction. Within the head is an externally threaded nipple 13 through which the oxygen is discharged, and mounted on this nipple is a cone 14 which stands over an opening 15 into which the gas is discharged, and in the sides of this cone are a series of perforations 16 through which the gas escapes. The use of a cone gives a comparatively large gas chamber obviating clogging and admitting of a more compact design of head. The outer end of the head is internally threaded to receive the threaded shank 17 of a nozzle 18 which, as shown in Fig. 2 of the drawings is the style used for welding and is a hollow nozzle having a discharge opening 19, the nozzle forming a continuation of the chamber 3 and in which the air and gas are mixed before they are discharged.

The nozzles are interchangeable and the size of the discharge opening will depend on the thickness of the metal to be welded. To adapt the blow pipe for use in cutting, the welding nozzle 18 is removed and an auxiliary nipple 20 is screwed onto the nipple 13. This auxiliary nipple 20 has perforations 21 adjacent to the outer end of the nipple 13 and has an enlarged head 22 which has a series of longitudinal grooves 23 and terminates in a tip 24 with a discharge opening 25. The cutting nozzle 26 like the nozzle 18 is adapted to be screwed into the head and has an opening 27 in its outer end corresponding to the tip 24 which closely fits it and at one side of the opening in the tip is a short groove 28 forming an outlet from the chamber 3 at one side of the tip. Gas will be admitted through the cone as before described, and into the chamber 3. There it will be mixed with oxygen entering the chamber through the perforations 21. This mixture is discharged through the small groove 28. At the same time a quantity of oxygen will pass through the auxiliary nipple and be discharged adjacent to the discharge of gas, and this blast of oxygen adjacent to the gas flange produces excessive heat which readily cuts the metal. The grooves in the auxiliary nipple also tend to prevent fireback.

I claim:—

1. A blow pipe comprising a head, a chamber within said head, a nozzle attached to said head, a nipple in said chamber, a cone mounted on said nipple, an auxiliary nipple connected with said nipple, perforations in the auxiliary nipple adjacent to the stationary nipple, said auxiliary nipple formed near its outer end with an enlarged head having longitudinal grooves, and with a reduced tip, said nozzle inclosing the auxiliary nipple and having an opening in its end conforming to the said tip, and a discharge groove at one side of the tip, substantially as described.

2. A blow pipe comprising a head, a chamber within said head, a nozzle attached to said head, a nipple in said chamber, an air pipe, a cone mounted on said nipple, and a gas pipe, said gas pipe composed of a plurality of small straight tubes, substantially as described.

In testimony whereof, I have signed this specification in the presence of two subscribing witnesses.

ERASTUS S. KIMBALL.

Witnesses:
FREDERIC C. EARLE,
CLARA L. WEED.